United States Patent [19]
Marquis

[11] 3,777,798
[45] Dec. 11, 1973

[54] SAFETY WHEEL

[76] Inventor: Olan E. Marquis, South Star Rt., Box 63-A, Portales, N. Mex. 88130

[22] Filed: Feb. 14, 1972

[21] Appl. No.: 225,711

[52] U.S. Cl. .............................................. 152/158
[51] Int. Cl. ........................................... B60c 17/04
[58] Field of Search .................................. 152/158

[56] References Cited
UNITED STATES PATENTS

| | | | |
|---|---|---|---|
| 3,645,312 | 2/1972 | Kolodziej | 152/158 |
| 3,420,288 | 1/1969 | Unruh | 152/158 |
| 3,528,472 | 9/1970 | Kubach | 152/158 |
| 2,241,858 | 5/1941 | Hruska | 152/158 |
| 3,682,218 | 8/1972 | Johannsen et al. | 152/158 |
| 3,519,053 | 7/1970 | Lindley | 152/158 |

*Primary Examiner*—Gerald M. Forlenza
*Assistant Examiner*—Robert Saifer
*Attorney*—Harvey B. Jacobson

[57] ABSTRACT

An improved wheel for any automotive vehicle such as a passenger car, a truck or the like, the wheel including a radially outwardly projecting flange all around and which extends into the compressed air space surrounded by the tire, the outer end of the flange being approximately 2½ inches away from the inner peripherial edge of the tire so that in case of a blow-out of the tire, the drop of the vehicle body is limited to this dimension instead of dropping to the wheel rim, thus preventing a serious accident or possibly turning over of the vehicle.

4 Claims, 4 Drawing Figures

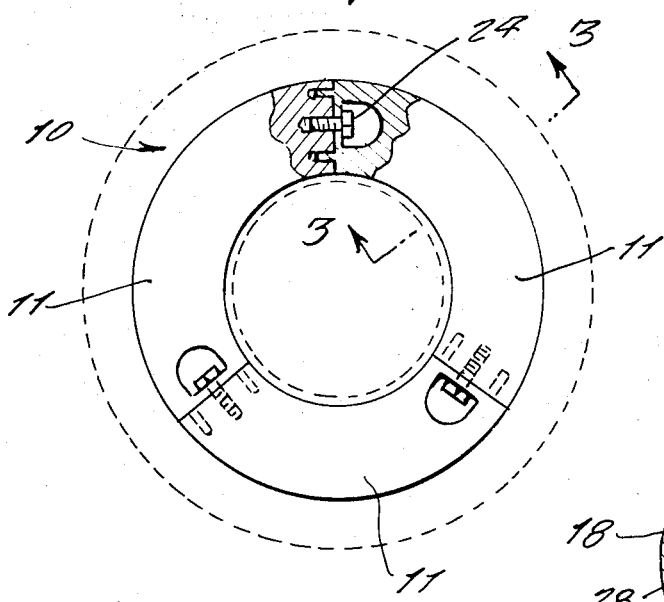
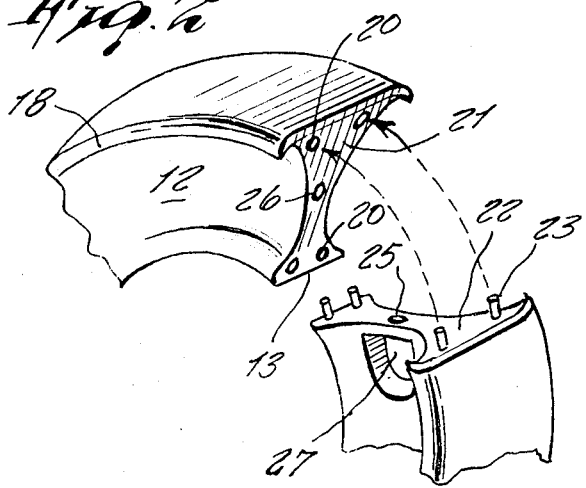
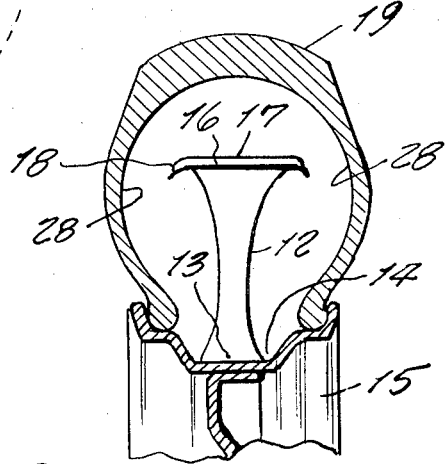
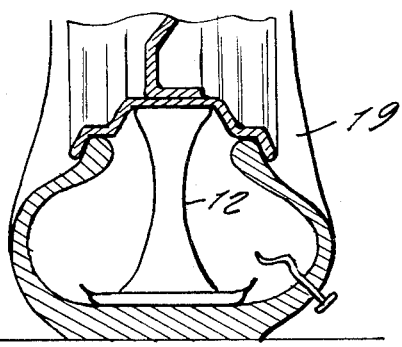

SAFETY WHEEL

This invention relates generally to automotive vehicle wheels.

A principal object of the present invention is to provide a safety wheel which will prevent accidents caused by tire trouble.

Another object of the present invention is to provide a safety wheel which will ride free inside of a tire and will not interfere with the parking of the vehicle against curbs nor with hitting bumps upon rough roads.

Still another object of the present invention is to provide a safety wheel which will not in any way interfere with the normal performance of the vehicle.

It is generally well known to most motorist that a blow-out at a high rate of traveling speed will let a car to drop approximately 6 inches on the side of the blow-out, thus starting a tire to criss-cross and causing the tire to run off from the wheel rim while the rim starts to dig into the road surface, thus causing the driver to lose control of the car and possibly causing the automobile to turn over. This situation is of course objectionable and therefore in want of improvement.

Accordingly it is the principal object of the present invention to provide a safety wheel which overcomes the above objection by not permitting the car body to drop such a great distance in case of a blow-out of the tire.

Another object of the present invention is to provide a safety wheel which is readily adaptable for all vehicles that ride upon pneumatic tires, and which will promote safety upon the highways.

Other objects of the present invention are to provide a safety wheel which is simple in design, inexpensive to manufacture, rugged in construction, easy to use and efficient in operation.

These and other objects will be readily evident upon a study of the following specification and accompanying drawing wherein:

FIG. 1 is a side elevation view of the present invention shown partly in cross section, and showing the wheel and tire in dotted lines.

FIG. 2 is a detail view in perspective and illustrating how the invention components are interfitted and interconnected together.

FIG. 3 is a cross sectional view taken on line 3—3 of FIG. 1 and shown enlarged.

FIG. 4 is a view similar to FIG. 3 and showing the present invention in operative use by supporting a flat tire so that it does not fully collapse.

Referring now to the drawing in detail, the reference numeral 10 represents a safety wheel according to the present invention wherein the same is comprised of three sections 11 each one of which is 120 degrees in length so that when interfitted together they form a circular assembly.

Each of the arcuate sections 11 comprises a relatively thin flange 12 provided with an inner peripherial edge 13 for placement within the circular channel 14 of a conventional automobile wheel 15. The outer peripherial edge of the flange forms an outer band 16 which has a one half inch thick hard rubber covering 17 baked thereupon. As shown in FIG. 3 of the drawing, it is to be noted that the flange 12 is relatively wide near the outer band 16, and relatively narrow at its base portion adjacent the inner peripherial edge 13. The height of the flange is approximately 4 inches while the outer band is approximately 4 inches in width. The side edges 18 of the outer band curve approximately one-fourth of an inch toward the wheel on each side so to avoid cutting the tire 19 in case the tire has a blow-out and the outer band 16 drops upon the inner peripherial face of the tire. The thickness of the flange at the inner peripherial edge is approximately 1 inch.

The safety wheel sections 11 are made of light weight, durable metal and are made of sizes to fit standard wheels of different automotive vehicles.

The safety wheel sections 11 are inter-fitted together by means of each section having a plurality of openings 20 on one end wall 21 and the opposite end wall 22 is provided with a plurality of extending pins 23. The pins 23 of one section 11 readily fit into the openings 20 of an adjacent section.

Each pair of adjacent sections 11 are interconnected together by means of a bolt 24 receivable through a clearance opening 25 formed through the corresponding end wall 22 and threadingly engaged, in a threaded bore 26 in the opposing end wall 21. A window or clearance space 27 is formed in the flange 12 behind the end wall 22 so to permit insertion of the bolt 24 into the opening 25. The bolt head remains seated within the clearance space 27, as is readily shown in FIG. 1 when the sections are assembled together.

It is to be noted that when the tire 19 is properly inflated, there is a space between the outer band and the inner peripheral edge of the tire that is approximately 2 ½ inches. Likewise a same amount of 2 ½ inches exist between the curved over edges 18 of the outer band and the sides 28 of the tire 19.

With a conventional automobile wheel, a blow-out at a high rate of speed will let the car drop approximately 6 inches and generally start a tire to criss-cross, thus causing the tire to run off the rim and let the rim dig into the road surface, thus causing the driver to lose control of the vehicle and possible result in the car being overturned.

The same blow-out with a safety wheel 10, as presented by the present invention, will permit the car to drop approximately only 2 ½ inches on the safety wheel, thus preventing the tire from criss-crossing and running off the rim. Therefore the rim is kept from digging into the road surface and a wreck is prevented and a driver is able to keep the car under control and come to a safe stop.

With an ordinary inflated conventional wheel, if a driver tries to make a curve to fast or swerve to miss an object on the highway, the force of the action forces the air in the tire to one side with the possibility the rim of wheel may dig down into the road surface, and cause the driver to lose control of the car and result in an accident.

With the present safety wheel invention, if the driver makes a curve or swerve the vehicle to miss an object on the highway and the air in the tire is forced to one side, letting the vehicle will drop down approximatley only 2 ½ inches onto the safety wheel, thus keeping the rim from digging into the road surface and avoiding an accident.

With a conventional ordinary wheel, if the tire goes down slowly whiie driving, there is a good possibility of ruining the tire. With the present safety wheel, the wheel rim does not drop 6 inches but is let down only 2 ½ inches, thus saving the tire and possibly avoiding the accident. With the present invention, the motorist can drive a car with a flat for several miles without damaging the tire. Thus he is able to proceed traveling until he can come to a service station instead of necessarily stopping and regardless of the weather have to change a flat tire.

With a conventional wheel on a pick-up and camper which is inclined to be top heavy, if a tire blows out while driving, the weight of the top heavy camper will be unbalanced to the extend of possibly causing the pick-up or camper to turn over. With the present safety wheel invention, if a tire blows out while driving it will drop only 2 ½ inches, not enough to unbalance the pick-up or camper, therefore letting the driver to keep the vehicle under control and possibly avoiding accident.

The same applies to pick-ups loaded with live stock or live stock trailers which with a conventional wheel, if a stock gets to shifting from side to side pushes the trailer down putting all the weight on one tire possibly causing a blow-out or start the trailer to whip, thus causing the driver to lose control of the vehicle and possible result in an accident. With the present safety wheel invention, when the stock shifts putting all the weight on one tire, it lets the vehicle down approximately only 2 ½ inches onto the safety wheel, thus preventing the tire to blow-out or the trailer from whipping which would result in an accident.

The present invention is also effective on mobile homes with two or more axles having conventional wheels on two or more of the axles, and wherein if one of the tires has a flat, it throws extra weight on the other tires on the same side, possibly causing the other tires to burst and thus cause whipping of the trailer or possibly turning over of the trailer. With the present safety wheel invention, if a flat occurs on one of the tires, it will drop only 2 ½ inches onto the safety wheel, thus keeping the extra weight off the other tires, thus avoiding the other tires from blowing out and causing the whipping of the trailer and possible turnover thereof.

Thus there is provided a safety wheel that has numerous advantages over present existing vehicle wheels.

What I now claim is:

1. In combination, a vehicle wheel including a central outer periphery of reduced diameter, a safety assembly mountable on said central outer periphery, said safety assembly comprising three arcuate sections disposed in end aligned and at least substantially end-abutted relation about said outer periphery, each of said sections projecting radially outwardly from and extending approximately one third the distance about said central outer periphery and including axially thickened inner and outer marginal portions, each pair of adjacent sections including inner and outer pairs of axially spaced coacting endwise outwardly opening blind bores and endwise outwardly projecting pins carried by the inner and outer marginal portions of said adjacent ends with said pins snugly received in said blind bores, one end of each pair of adjacent section ends including a tranverse window formed therethrough intermediate the corresponding axially thickened inner and outer marginal portions and an endwise outwardly opening formed therein whose inner end opens into said window, the other end of each pair of adjacent section ends including an endwise outwardly opening threaded blind bore registered with the outer end of the corresponding opening, and a threaded and headed shank type fastener extending through each opening and threaded in the corresponding threaded blind bore, whereby said pairs of adjacent ends are clamped together with the inner marginal portions of said sections clampingly engaging said central outer periphery of said wheel.

2. The combination of claim 1 wherein the outer periphery of each section includes a covering of resilient material.

3. The combination of claim 1 wherein the opposite axial faces of said safety assembly are regular and defined by radial lines of predetermined contours generated about the center axis of said annular safety assembly.

4. The combination of claim 1 wherein each of said sections extends through an arc of 120°.

* * * * *